United States Patent
Keng

[19]

[11] Patent Number: 6,101,728
[45] Date of Patent: Aug. 15, 2000

[54] VERSATILE VH LASER PLUMB

[76] Inventor: Hai Lin Keng, 2408 Branch La., Brea, Calif. 92621

[21] Appl. No.: 09/007,458

[22] Filed: Jan. 15, 1998

[51] Int. Cl.[7] .................................................... G01C 15/10
[52] U.S. Cl. ................................ 33/283; 33/281; 33/285; 33/DIG. 21
[58] Field of Search ............................. 88/227, 228, 281, 88/282, 283, 285, 286, 290, 293, DIG. 21; 33/391, 392, 393, 394

[56] References Cited

U.S. PATENT DOCUMENTS

| | | | |
|---|---|---|---|
| 4,206,550 | 6/1980 | Boyett et al. | 33/286 |
| 4,461,091 | 7/1984 | Gammon | 33/392 |
| 4,597,186 | 7/1986 | Markos | 33/392 |
| 4,625,428 | 12/1986 | Griffin | 33/348 |
| 5,367,779 | 11/1994 | Lee | 33/290 |
| 5,481,809 | 1/1996 | Rooney | 33/392 |
| 5,537,205 | 7/1996 | Costa et al. | 356/250 |
| 5,784,792 | 7/1998 | Smith | 33/227 |
| 5,912,733 | 6/1999 | Dunlop et al. | 356/250 |

FOREIGN PATENT DOCUMENTS

| | | | |
|---|---|---|---|
| 4-221709 | 8/1992 | Japan | 33/286 |

*Primary Examiner*—Andrew H. Hirshfeld
*Assistant Examiner*—R A Smith
*Attorney, Agent, or Firm*—Charles C. H. Wu; Charles C. H. Wu & Associates, APC

[57] ABSTRACT

A plumb system for construction projects having a laser module embedded within includes a spring or the like device acting as a connecting device to a tripod or the like apparatus for projecting a vertical laser beam to a vertical end point, from the floor to a certain top point. Conversely, a spring or the like device mounted to the opposite end of the laser module of the plumb can be mounted to a certain high point for projecting a top to bottom laser beam for determining an end point at the floor. An optional horizontal base designed to horizontally receive the plumb for projecting a horizontal laser beam. A horizontal level indicator mounted onto the horizontal base can ensure a true horizontal plane. An optional self standing horizontal block can be used to determine the intermediate points of the horizontal laser beam. In addition, it can be used as a fixed point on a vertical surface by positioning the laser beam to lock on to it, the other horizontal point in line with the fixed point can be determined.

8 Claims, 4 Drawing Sheets

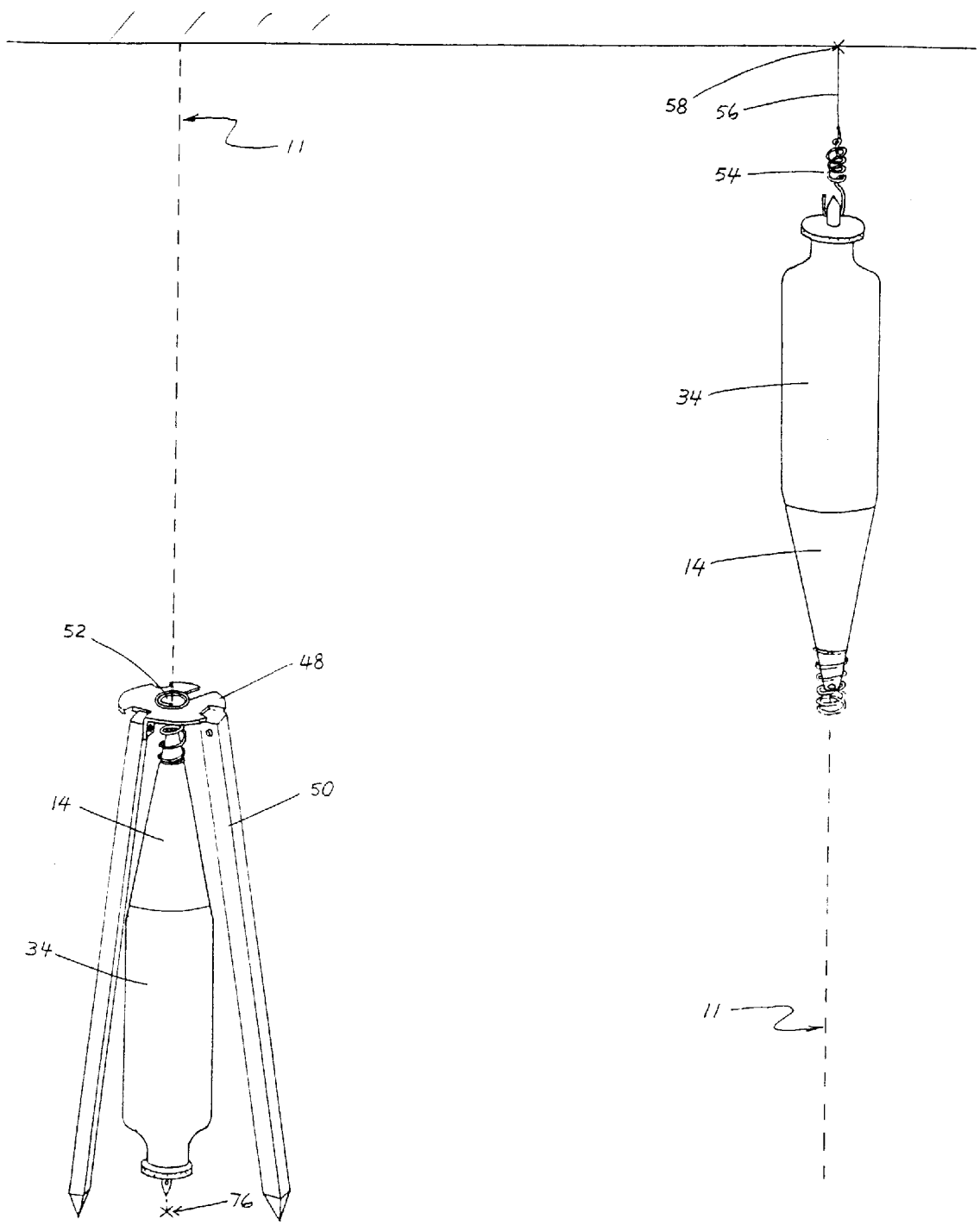

VERSATILE VH LASER PLUMB

BACKGROUND OF THE INVENTION

The present invention relates to a plumb for indoor and outdoor construction and remodeling projects. A plumb is primarily being used for finding out the exact straight-line point from one point to another typically in connection to a construction project.

Plumbs are known in the prior arts implemented by a solidly filled metal having a sharp end at one end and a string attached to the other end. This type of traditional plumb has disadvantages, including one or more of the following:

1. two persons are required to set up the plumb in that one person must fix one end of the plumb by holding or mounting the string and another person must mark the end point pointed by the plumb;
2. if two persons are not available, then one person must perform the task of two persons; thus, increasing the turn-around time for the project;
3. a ladder or a climbing equipment is required if one end of the plumb is needed to be affixed at a high place; and
4. the standard of deviation associated with the traditional plumb is high due to uncontrollable external influential sources such as wind and floor vibration.

Another known prior art is a plumb having a laser module mounted on a tripod like device. This type of traditional plumb has disadvantages, including one or more of the following:

1. the standard of deviation is high due to the fact that there are many internal sources contributing to the overall deviations;
2. the projected end point deviation is exacerbated as the designed end point distance gets longer;
3. the system is fairly delicate in that a complex laser module self-leveling system is employed;
4. high manufacturing cost is involved in producing the system resulting in a fairly expensive end product;
5. a complex design is being used in compensating for the standard of deviation associated with this type of plumb; and
6. a delicate housing design is employed with many components and moving parts all of which contribute to a high overall standard of deviation.

The construction industry is a highly competitive industry with a high demand for a short turn-around time and low labor cost. New innovations are being used in many structural components such as structural foundations, roofing of structures, composite materials in insulations and walls, and electrical conduits. This invention will serve as a nice compliment to the innovative construction industry.

The cost for human labor is always rising. As history has shown, the set minimum wage in this country has not gone down and has consistently increased with time. As a result, means for saving human labor costs is always an attractive option to investigate.

One way of saving human costs is to make the work process more efficient. More efficient by cutting down the turn around time and the number of staff required to accomplish a task, and that is the objective of the present invention.

The present invention replaces the traditional plumb that requires two persons to set up and further for providing a means for affixing one end to the starting point of the plumb. The present invention also matches all the functionality of a plumb containing a laser pointing module but with a lower production cost and a lower standard of deviation.

SUMMARY OF INVENTION

The present invention is a plumb designed for determining the projected end point from one fixed point. The end point may be on a vertical or horizontal plane with respect to the fixed origin.

The present invention is intended to replace the time consuming traditional multi-person operation plumbs or the expensive laser plumbs.

For ease of presentation, this section describes a device where the employment of a plumb on a vertical plane and a horizontal plane. Other orientations are possible and this description is not intended to limit the scope of the invention to any particular geometry of the elements.

The present invention meets the requirement of a short time set up of a plumb by employing a laser module embedded inside of a traditional plumb mounted and balanced on a flexible spring for self leveling. For the vertical operation, the spring is affixed to a tripod or the like device and the laser plumb hangs from the spring. The laser embedded plumb self levels vertically due to the flexible spring and the earth's constant gravity making a vertical pull on the plumb. Moreover, the flexible spring acts as a shock absorber insulating minor surface vibration in which the tripod rests on.

The embedded laser module is mounted inside of a housing that resembles a traditional plumb. The laser must travel a pre-determined distance prior to coming out of the housing. The purpose for traveling a pre-determined distance is to ensure that the laser module is in alignment with the elongated axis of the plumb and should it not be in alignment, the laser will bounce off the housing wall and not come out. This is a self checking mechanism of the invention to ensure accuracy of the device.

An screw-in type of end plug mounted at the end of the plumb housing acts as a switching device. The plumb housing acts as a conduit between the negative terminal of the battery and the laser module. A separator spring mounted between the laser module and the positive terminal of the battery separates and prevents the positive terminal of the battery from making contact with the laser module's positive terminal. When the end plug is screwed inward into the battery cavity, it pushes the battery inward, compressing the separator spring and the battery's positive terminal makes contact with the laser module's positive end, completing the circuit and turns on the laser module.

The laser module is powered by a battery or several batteries. The tripod typically has three legs. However, additional legs can be employed for additional support.

A pointer mounted at the end plug acts as a guidance for pin pointing the fixed end. A user may use a marker and mark the fixed end point.

The above described operation describes a typical operation where the ground is the fixed point and the laser beam is projected up from the ground. Conversely, a fixed point at the high point projecting the laser beam downward to the ground is possible.

For the top to bottom operation, the pointer contains a spring mounting hole for connecting to a flexible spring for hanging the plumb at the end pointer. The flexible spring is attached to a string or a rope. The string or rope can then be affixed to a building structure for a fixed end point. The laser module then is turned on and projects the other end point at the ground.

Horizontal operation of the Versatile VH Plumb can be accomplished by having the plumb placed on to a horizontal operation base. The horizontal operation base contains an air bubble type of level indicator. Once a horizontal level has been achieved, the laser module can be switched on and project the end point. An optional self standing horizontal reference block can be used in conjunction with the horizontal operation to determine the intermediate points of a horizontal laser beam. It can also be used as a predetermined fixed point in a horizontal operation in that an user to project the laser beam onto it and mark the other end using the pointer as a guidance.

BRIEF DESCRIPTION OF THE DRAWINGS

These and other features, aspects, and advantages of the present invention will become better understood with reference to the following description, appended claims, and accompanying drawings, where:

FIG. 2 is a view of the plumb in vertical operation operating from a ground fixed point to a top projected end point;

FIG. 3 is a view of the plumb in vertical operation operating from a top end point to a bottom projected end point;

DESCRIPTION OF THE PREFERRED EMBODIMENT

The present invention is directed to a plumb for construction projects. This type of plumb is particularly suitable for projecting a vertical and horizontal end point. With reference to FIGS. 1–6, a Versatile VH Plumb 10 having a laser module housing 14. The laser module housing 14 having a laser module cavity 26. A laser module 12 is disposed in the laser module cavity 26. A battery separator spring 30 is mounted to the laser module 12.

Figure 1:
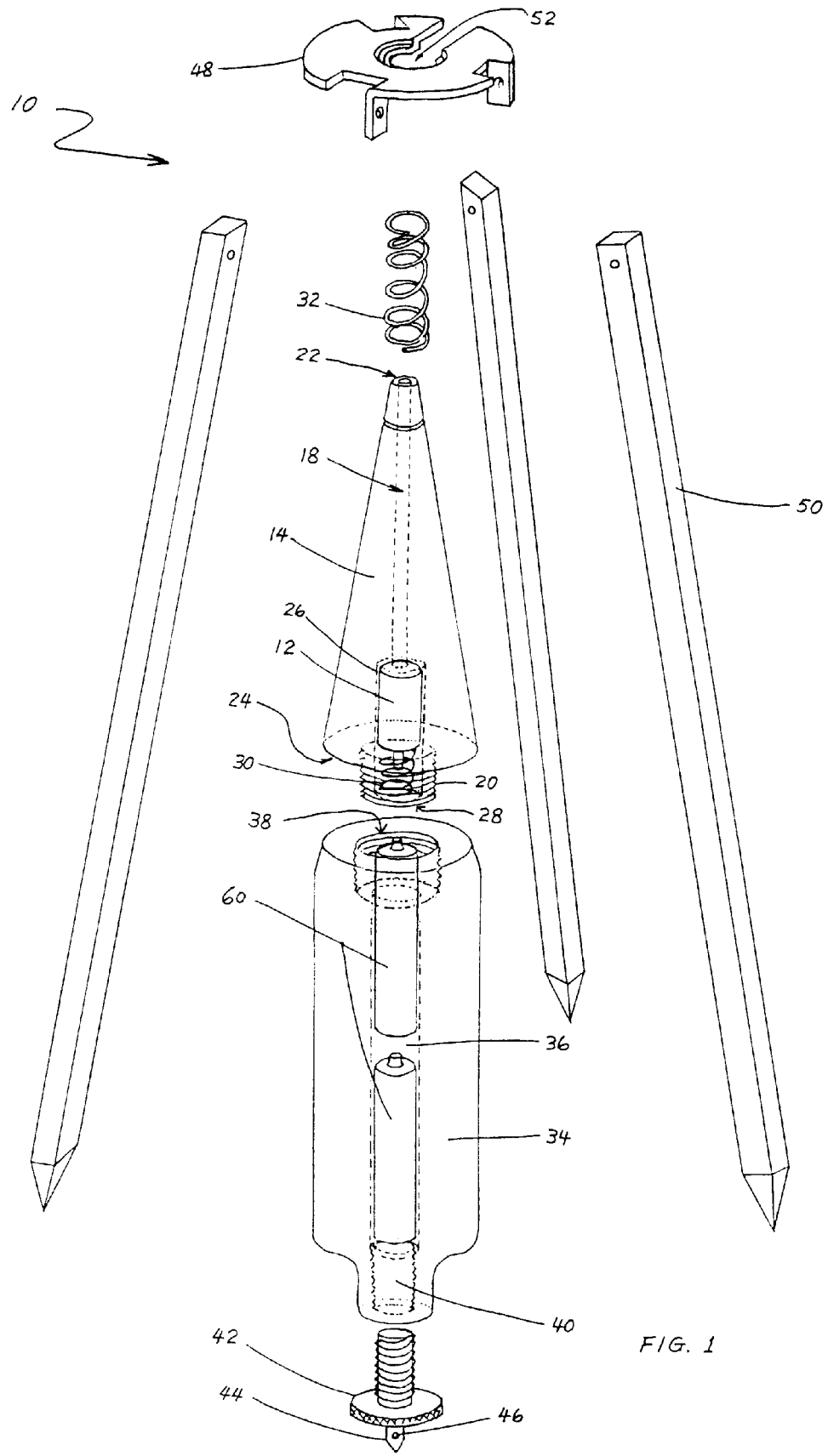
FIG. 1 is a vertical view of the plumb according to the present invention for the vertical operation.

The laser module housing 14 having two ends. One end having a converging end point 22. The other end having a flat surface 24. A laser passage bore 18 for the passage of the laser beam 11 to shoot out from the laser module 12 is vertically disposed between the laser module cavity 26 and the converging end point 22, as shown in FIG. 1.

The laser module housing 14 is made of solid metal. A protruded threaded member 16 having a bore 28 perpendicular with its thread 20 is disposed in its center contiguous to the flat surface 24 of the laser module housing 14. A self-leveling spring 32 is mounted to the converging end point 22 of the laser module housing 14.

A battery housing 34 having two ends. The battery housing 34 having a battery cavity 36 disposed through its center along its vertical axis as shown in FIG. 1. A top battery housing threaded bore 38 adapted to mate with the protruded threaded member 16 is disposed at one end of the battery housing 34. A bottom battery housing threaded bore 40 is disposed at the opposite end. An threaded end plug 42 is threaded into the bottom battery housing threaded bore 40. A pointer 44 is mounted to the end plug 42. The pointer 44 contains a pointer bore 46 therethrough. The pointer 44 is used as a guidance to the user for marking a fixed reference point 76.

Two Batteries 60 can be deposited into the battery cavity 36. In the configuration of FIG. 1, two batteries 60 are employed. However, a single battery or a quantity larger than 2 can be employed and this description is not intended to limit the scope of the invention.

The laser module housing 14 is mated to the battery housing 34 by screwing the protruded threaded member 16 into the top battery housing threaded bore 38. Upon turning of the threaded end plug 42 inward into the bottom battery housing threaded bore 40 and thereby pushing the positive terminal of the battery into contact with the laser module 12, the laser module 12 is energized and laser beam 11 is shot out.

The self-leveling spring 32 is mounted to a tripod mounting member 48. The tripod mounting member 48 is mounted to a tripod 50. As shown in FIG. 2, the tripod mounting member 48 having a laser passage bore 52 located at its center enabling the laser beam 11 passing through the tripod mounting member 48.

FIG. 3 shows a configuration of the Versatile VH Plumb 10 operating in a top to bottom fashion. A top fixed reference point 58 is predetermined and the laser module 12 projects the laser beam 11 downward. A top mounting spring 54 is attached to the pointer bore 46. A string 56 is attached to the top mounting spring 54 and can be affixed to a top fixed reference point 58.

Figure 4:
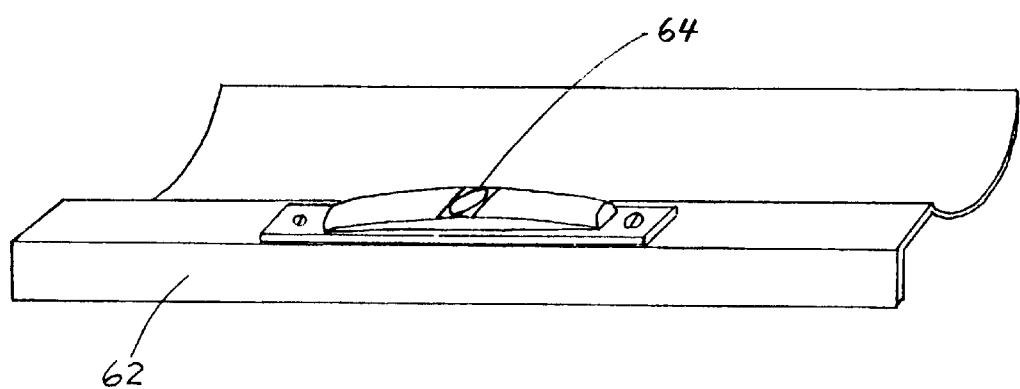
FIG. 4 is a view of the horizontal operation base for horizontal operation.
Figure 5:
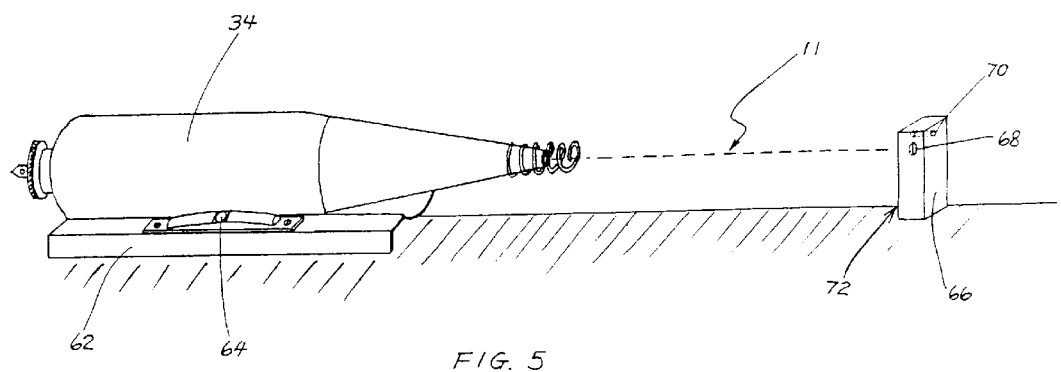
FIG. 5 is a view of the plumb in horizontal operation projecting a horizontal laser beam using the optional self standing horizontal reference block both resting on the floor.

FIGS. 4 and 5 show a horizontal operation of the Versatile VH Plumb 10. An optional base for horizontal operation 62 is shaped to accept the battery housing 34. As shown in FIG. 5, the Versatile VH Plumb 10 rests securely on the base for horizontal operation 62. A horizontal level indicator 64 is mounted onto the base for horizontal operation 62. An air bubble type of horizontal level indicator 64 is shown here. Although an air bubble type horizontal level indicator is shown here, other means for indicating horizontal level can be employed and the air bubble type shown here is not intended to limit the scope of the invention.

For the purpose of determining intermediate points 72 on the horizontally projected laser beam 11, an optional self standing horizontal reference block 66 can be employed. The optional self standing horizontal reference block 66 having a horizontal reference mark 68. The vertical distance from the bottom of the optional self standing horizontal reference block 66 to the horizontal reference mark 68 is consistent with the vertical distance between the bottom of the base for horizontal operation 62 and the laser beam 11 projected out of the laser module 12.

Figure 6:
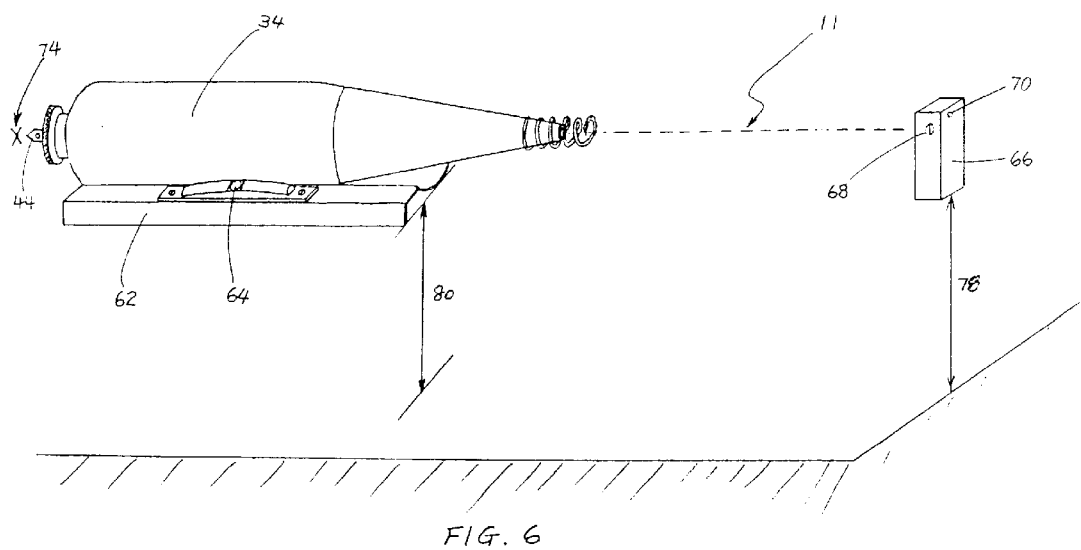
FIG. 6 is a view of the plumb in horzontal operation using the optional self standing horizontal laser beam both are at a fixed distance above the floor.

The optional self standing horizontal reference block 66 having a mounting hole 70 for mounting onto a wall. As shown in FIG. 6, the optional self standing horizontal reference block 66 can be mounted to a fixed end point. An user may project the laser beam 11 onto the horizontal reference mark 68 and use the pointer 44 as a guidance to mark the other end point 74, provided that the bottom of the self standing horizontal reference block 66 rests on the same horizontal place as the optional base for horizontal operation 62.

As shown in FIG. 6, once the vertical distance 78 between the floor and the optional self standing horizontal reference block 66 is fixed or predetermined, the vertical distance 80 between the optional base for horizontal operation 62 and the floor can be determined by projecting the laser beam 11 onto and hitting the horizontal reference mark 68.

Although the present invention has been described in considerable detail with reference to certain preferred versions thereof, other versions are possible. For example, a flexible rubber tubing can be employed instead of the self-leveling spring 32 and the top mounting spring 56. A separator mean made of plastic or rubber can be employed instead of the battery separator spring 30. The means for mating the battery housing to the laser module housing can be comprised of a flexible rubber instead of a protruded threaded member 16. The threaded end plug 42 can be replaced with a non-threaded plastic or the like material. A plurality of batteries 60 can be employed. And lastly, any apparatus that will enable the Versatile VH Plumb 10 be vertically positioned can be employed instead of a tripod 50.

Therefore, the spirit and scope of the appended claims should not necessarily be limited to the description of the preferred versions contained herein.

What is claimed is:

1. A plumb system comprising:
   (a) a laser module housing having a converging end and a flat surface end, a cavity disposed at the flat surface end, and a bore between and through the converging end and the cavity;
   (b) a threaded member having threads and further having a bore perpendicular to the threads mounted at the flat surface end of the laser module housing;
   (c) a laser module having a separator means disposed in the cavity, said laser module for producing a laser beam which passes through the bore in said laser module housing;
   (d) a battery housing having a top end, a bottom end, a battery cavity, and a top threaded bore disposed at the top end adapted to mate with the threaded member, and a bottom threaded bore disposed at the bottom end;
   (e) a threaded end plug having a pointer adapted to mate with the bottom threaded bore of the battery housing, the threaded end plug is screwed into the bottom threaded bore of the battery housing;
   (f) the pointer having a pointer bore;
   (g) an attaching means mountable to the pointer bore;
   (h) the laser module housing is mated to the battery housing through mating the threaded member into the top threaded bore of the battery housing;
   (i) a vertical standing apparatus having a mounting point;
   (j) a connecting means having a top end, and a bottom end, the top end is attached to the mounting point of the vertical standing apparatus; and
   (k) the converging end of the laser module is attached to the bottom end of the connecting means.

2. The plumb system of claim 1, wherein the separator means is comprised of a flexible material.

3. The plumb system of claim 1, wherein the attaching means is comprised of a flexible material.

4. The plumb system of claim 1, wherein the connecting means is comprised of a flexible material.

5. A plumb system comprising:
   (a) a laser module housing having a converging end and a flat surface end, a cavity disposed at the flat surface end, and a bore between and through the converging end and the cavity;
   (b) a threaded member having threads and further having a bore perpendicular to the threads mounted at the flat surface end of the laser module housing;
   (c) a laser module having a separator means disposed in the cavity, said laser module for producing a laser beam which passes through the bore in said laser module housing;
   (d) a battery housing having a top end, a bottom end, a battery cavity, and a top threaded bore disposed at the top end adapted to mate with the threaded member, and a bottom threaded bore disposed at the bottom end;
   (e) a threaded end plug having a pointer adapted to mate with the bottom threaded bore of the battery housing, the threaded end plug is attached to the bottom end of the battery housing;
   (f) the pointer having a pointer bore;
   (g) an attaching means is mountable to the pointer bore;
   (h) the laser module housing is mated to the battery housing through mating the threaded member into the top threaded bore of the battery housing;
   (i) a vertical standing apparatus having a mounting point;
   (j) a connecting means having a top end, and a bottom end, the top end is attached to the mounting point of the vertical standing apparatus;
   (k) the converging end of the laser module is attached to the bottom end of the connecting means;
   (l) a horizontal base adapted to receive the battery housing, the horizontal base having a horizontal level indicator; and
   (m) a reference block having a vertical surface, a point marked on the vertical surface, and the reference block further having a mounting bore.

6. The plumb system of claim 5, wherein the separator means is comprised of a spring.

7. The plumb system of claim 5, wherein the attaching means is comprised of a spring.

8. The plumb system of claim 5, wherein the connecting means is comprised of a spring.

* * * * *